United States Patent
Pelletier

(12) 
(10) Patent No.: US 6,853,809 B2
(45) Date of Patent: Feb. 8, 2005

(54) CAMERA SYSTEM FOR PROVIDING INSTANT SWITCHING BETWEEN WIDE ANGLE AND FULL RESOLUTION VIEWS OF A SUBJECT

(75) Inventor: Daniel Pelletier, Lake Peekskill, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 373 days.

(21) Appl. No.: 09/772,476

(22) Filed: Jan. 30, 2001

(65) Prior Publication Data

US 2002/0102101 A1 Aug. 1, 2002

(51) Int. Cl.[7] ............................. G03B 17/00; H04N 7/18
(52) U.S. Cl. ........................ 396/85; 348/159; 348/169
(58) Field of Search ......................... 396/85, 58, 153; 348/143, 159, 169

(56) References Cited

U.S. PATENT DOCUMENTS

| | | | | |
|---|---|---|---|---|
| 4,199,785 A | * | 4/1980 | McCullough et al. | 348/704 |
| 5,005,083 A | * | 4/1991 | Grage et al. | 348/588 |
| 5,185,667 A | | 2/1993 | Zimmermann | 358/209 |
| 5,434,617 A | | 7/1995 | Bianchi | 348/170 |
| 5,627,616 A | * | 5/1997 | Sergeant et al. | 396/427 |
| 6,346,950 B1 | * | 2/2002 | Jouppi | 345/660 |
| 2002/0075258 A1 | * | 6/2002 | Park et al. | 345/419 |

FOREIGN PATENT DOCUMENTS

| | | | | |
|---|---|---|---|---|
| EP | 0529317 A1 | 3/1993 | | H04N/7/18 |
| WO | WO9945511 | 10/1999 | | G08B/1/00 |

* cited by examiner

*Primary Examiner*—David Gray
*Assistant Examiner*—Arthur A Smith
(74) *Attorney, Agent, or Firm*—Gregory L. Thorne

(57) ABSTRACT

A camera system and method for operating that system. The camera system comprises a stationary camera having a wide angle view, a remotely controllable camera having a relatively smaller angle view for providing images in substantially full resolution, and a processor. The processor monitors the wide angle view of the stationary camera, receives information concerning a selected desired subject within the wide angle view, generates an electronic pan-tilt-zoom view of the selected desired subject based on the wide angle view of the stationary camera, controls the remotely controllable camera for providing a view that overlaps the electronic pan-tilt-zoom view of the desired subject, and processes the electronic pan-tilt-zoom view of the desired subject in accordance with the resolution of the remotely controllable camera.

8 Claims, 1 Drawing Sheet

CAMERA SYSTEM FOR PROVIDING INSTANT SWITCHING BETWEEN WIDE ANGLE AND FULL RESOLUTION VIEWS OF A SUBJECT

BACKGROUND OF THE INVENTION

1. Field of the Invention

The present invention generally relates to a camera system and a method for operating same.

2. Description of Prior Art

In a conventional mechanical pan/tilt/zoom camera system, when a new region of interest is identified, a computer moves the manual camera to view that region and controls the zoom function of the camera in order to frame the new region of interest. On the other hand, conventional electronic-pan-tilt-zoom ("EPTZ") cameras remain stationary, but the region of interest is culled from the overall image and scaled to fit the display window. Furthermore, the resolution of the image of the EPTZ camera is significantly reduced when attempting to upscale a small region of interest to a relatively larger display. Although MPTZ cameras can provide a full resolution view of the desired region of interest, MPTZ cameras cannot immediately move to the next shot.

It is therefore an object of the present invention to provide a camera system that provides for instant switching between the view provided by an EPTZ camera and the view provided by an MPTZ camera.

Other objects and advantages of the present invention will be apparent to one of ordinary skill in the art in light of the ensuing description of the present invention.

SUMMARY OF THE INVENTION

In one aspect, the present invention is directed to a camera system that comprises a stationary camera having a wide angle view, a remotely controllable camera having a relatively smaller angle view for providing images in substantially full resolution, and a processor. The processor monitors the wide angle view of the stationary camera, receives information concerning a selected desired subject within the wide angle view, generates an electronic pan-tilt-zoom view of the selected desired subject based on the wide angle view of the stationary camera, controls the remotely controllable camera for providing a view that overlaps the electronic pan-tilt-zoom view of the desired subject, and processes the electronic pan-tilt-zoom view of the desired subject in accordance with the resolution of the remotely controllable camera.

In an alternate embodiment, the camera system of the present invention does not effect generation of data defining the desired subject. Instead, the view of the desired subject within the wide angle view is created by a user interface whereby the user manually selects the desired subject.

In another aspect, the present invention is directed to a method of operating a camera system comprising the steps of providing a camera system having a stationary camera providing a wide angle view and a remotely controllable camera set having a relatively smaller angle view for providing images in substantially full resolution, monitoring the wide angle view of the stationary camera, selecting a desired subject within the wide angle view, generating an electronic pan-tilt-zoom view of the desired subject based on the wide angle view of the stationary camera, controlling the remotely controllable camera for providing a view that overlaps the electronic pan-tilt-zoom view of the desired subject, and processing the electronic pan-tilt-zoom view of the desired subject in accordance with the resolution of the remotely controllable camera.

BRIEF DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

DETAILED DESCRIPTION OF THE INVENTION

Figure 1:
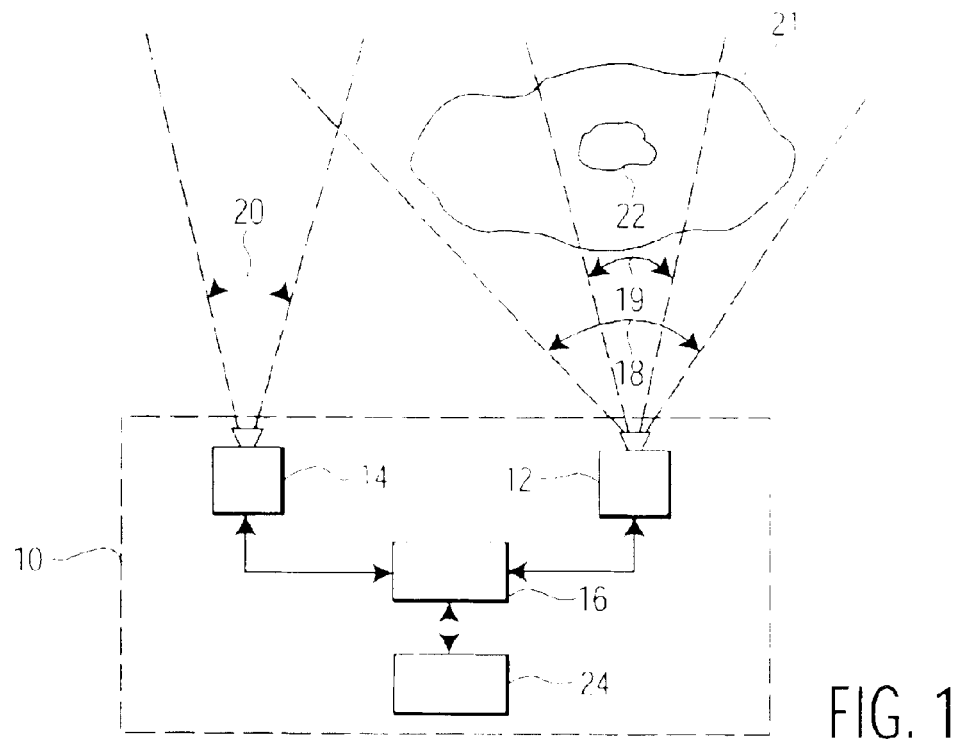
FIGS. 1 and 2 are block diagrams illustrating the operation of the camera system of the present invention.

Referring to FIG. 1, camera system 10 of the present invention generally comprises stationary camera 12, remotely controllable camera 14 and programmable processor 16. In one embodiment, stationary camera 12 comprises an electronic-pan-tilt-zoom ("EPTZ") camera. In one embodiment, camera 14 comprises a mechanical-pan-tilt-zoom ("MPTZ") camera. Cameras 12 and 14 are controlled by processor 16. Specifically, processor 16 issues commands that can cause camera 12 to electronically pan, tilt, zoom and focus as well as other camera functions. Remotely controllable camera 14 comprises motors (not shown) which effect pan, tilt, zoom and focus functions. The aforementioned motors are controlled by control signals outputted by processor 16. In one embodiment, processor 16 comprises a computer. One such computer is described in U.S. Pat. No. 5,434,617, the disclosure of which is incorporated herein by reference. Stationary camera 12 is configured to provide wide angle view 18. Remotely controlled camera 14 is configured to provide a relatively smaller angle view 20. The configuration of camera 14 allows for a relatively high and full resolution of a desired subject or region of interest.

Figure 2:
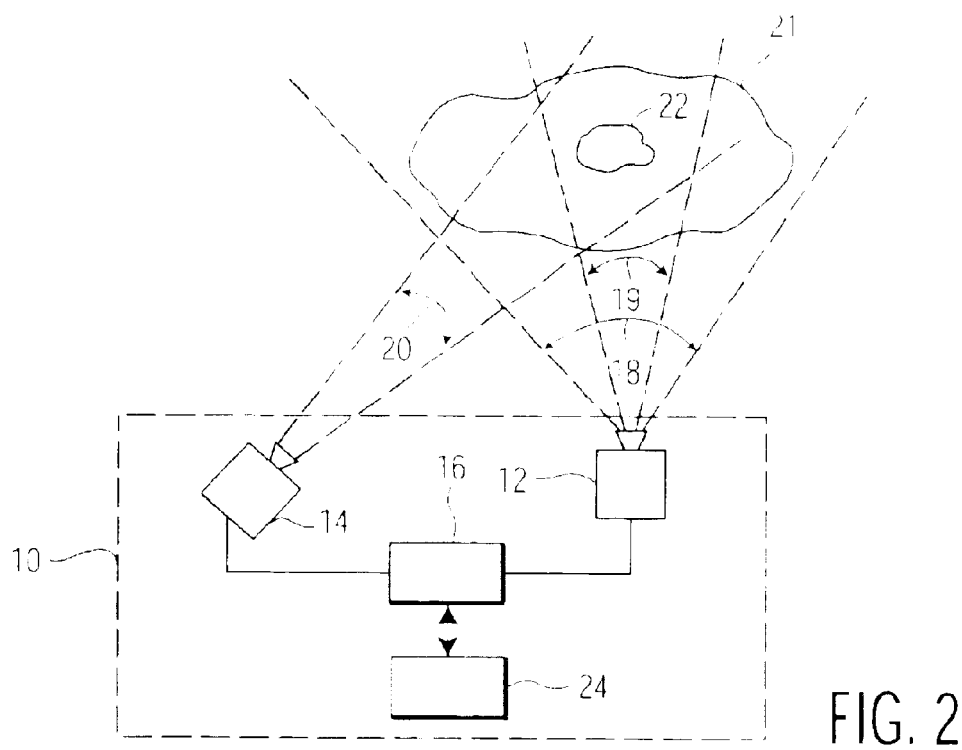

Referred to FIGS. 1 and 2, processor 16 monitors wide angle view 18 of stationary camera 12. Processor 16 generates pixel data defining a frame containing overall subject area 21 that is within wide angle view 18. Processor 16 also generates data defining the location of desired subject (or region of interest) 22 that is part of subject area 21 and within wide angle view 18. In one embodiment of the present invention, the pixel data defining desired subject or region of interest 22 is inputted into processor 16. Processor 16 then outputs an EPTZ view to display device 24. Processor 16 then controls remotely controllable camera 14 in accordance with the generated pixel data in such a manner that view 20 provided overlaps the portion of wide angle view 18 that contains desired subject 22 (see FIG. 2). Specifically, processor 16 controls the motors (not shown) of camera 14 so as to move camera 14 in such a manner that view 20 of camera 14 overlaps at least a portion of wide angle view 18 such that desired subject 22 is within view 20. Processor 16 then generates pixel data, based upon view 20, defining desired subject 22. Since camera 14 has the capability to provide a smaller, but relatively higher resolution view of desired subjects, the resulting view of desired subject 22 is displayed on a display device 24 with a relatively higher or fuller resolution. Once desired subject 22 is displayed on display device 24, camera 12 can then be controlled to provide a wide angle of view of a new subject area (not shown).

In an alternate embodiment, camera system 10 does not effect generation of data defining the desired subject. Instead, the view of the desired subject within the wide angle view is created by a user interface whereby the user manually selects the desired subject. In such an alternate embodiment, camera system 10 further includes a user interface (not shown) in electronic data communication with processor 16 and an additional display device (not shown) that constantly provides the user with the view of camera 12.

In a preferred embodiment, processor 16 is programmed with software that realizes well known optical flow techniques that are typically used in computer vision systems. These optical flow techniques allow camera system 10 to align the views from the stationary camera 12 and mechanical camera 14. In a preferred embodiment, processor 16 includes means for receiving calibration data that defines particular operational characteristics of stationary and remotely controlled cameras 12 and 14.

Each step of the method of the present invention is explained in the ensuing description with reference to FIGS. 1 and 2.

In the first step of the method of the present invention, processor 16 monitors wide angle view 18 and generates pixel data that defines view 18.

Next, a desired subject (or region of interest) 22 within wide angle view 18 is selected for viewing with full resolution by processor 16. The image of view 18 is processed using existing and known EPTZ techniques to provide view 19 of the desired subject with relatively low resolution. View 19 is then sent to display device 24.

Next, the pixel data outputted by camera 12 is inputted into processor 16. In response, processor 16 issues commands to camera 14 so as to cause view 20 to overlap view 19 which contains desired subject 22.

In the next step, processor 16 processes pixel data based upon view 20 and provides a full resolution view of desired subject 22.

Next, the full resolution view of desired subject 22 is displayed to viewers via display device 24. After desired subject 22 is displayed on display device 24, camera 12 can then be controlled to provide a wide angle of view of a new subject area (not shown) and the foregoing steps are repeated. In the alternative, after desired subject 22 is displayed to viewers on display 24, a new desired subject (not shown) can be selected from overall subject area 21 and the foregoing steps repeated.

A significant advantage of camera system 10 is that it provides for instant switching between shots, i.e. instant switching between a wide angle view to a full resolution view of a desired subject. Camera system 10 can be implemented with commercially available components. Furthermore, camera system 10 can be implemented at reasonable costs.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, having described the invention, what is claimed is:

1. A camera system, the system comprising:

a stationary camera having a wide angle view;

a remotely controllable camera having a relatively smaller angle view for providing images in substantially full resolution; and a processor for monitoring the wide angle view of the stationary camera, enabling selection of a desired subject within the wide angle view, generating an electronic pan-tilt-zoom view of the desired subject based on the wide angle view of the stationary camera, controlling the remotely controllable camera for providing a view that overlaps the electronic pan-tilt-zoom view of the desired subject, and processing the electronic pan-tilt-zoom view of the desired subject in accordance with the resolution of the remotely controllable camera, the processor further including means for receiving calibration data that defines particular operational characteristics of the stationary and remotely controlled cameras.

2. The camera system according to claim 1 wherein the stationary camera comprises a electronic-pan-tilt-zoom camera.

3. The camera system according to claim 1 wherein the remotely controlled camera comprises a mechanical-pan-tilt-zoom camera.

4. The camera system according to claim 1 wherein the processor comprises a computer.

5. The camera system according to claim 1 further including means for displaying the substantially full resolution view of the desired subject.

6. A method of operating a camera system, comprising the steps of:

providing a camera system having a stationary camera providing a wide angle view and a remotely controllable camera set having a relatively smaller angle view for providing images in substantially full resolution;

monitoring the wide angle view of the stationary camera;

selecting a desired subject within the wide angle view;

generating an electronic pan-tilt-zoom view of the desired subject based on the wide angle view of the stationary camera;

controlling the remotely controllable camera for providing a view that overlaps the electronic pan-tilt-zoom view of the desired subject;

processing the electronic pan-tilt-zoom view of the desired subject in accordance with the resolution of the remotely controllable camera; and providing calibration data that defines particular operational characteristics of the stationary and remotely controllable cameras.

7. The method according to claim 6 wherein the processing step further comprises the step of displaying the processed view of the desired subject.

8. The method according to claim 6 wherein the selecting step comprises the step of generating pixel data defining the desired subject within the wide angle view.

* * * * *